Patented Dec. 14, 1937

2,101,927

UNITED STATES PATENT OFFICE 2,101,927

PROCESS FOR NITRATING SUCROSE

Joseph A. Wyler, Allentown, Pa., assignor to Trojan Powder Company, Allentown, Pa.

No Drawing. Application September 28, 1936, Serial No. 102,979

7 Claims. (Cl. 260—145)

My invention relates to a process for the nitration of carbohydrates and more particularly relates to the nitration of sucrose. My invention has, as its principal object the providing of new and improved methods of obtaining crystalline sucrose octanitrate, and among other objects of my invention is the providing of methods for completely nitrating sugar to sugar octanitrate.

In my co-pending application S. N. 27,049 filed June 17, 1935, is disclosed a process for nitrating carbohydrates in the presence of nitrated esters of hydroxy aliphatic carboxylic acids.

As examples of suitable esters of hydroxy aliphatic carboxylic acids, mention was made of ethyl lactate, butyl lactate, ethyl glycollate, etc. and examples were given to show how these may be used in order to effect the nitration of sucrose to the octanitrate.

I have made the discovery that the addition of certain agents to the esters of hydroxy aliphatic carboxylic acids produces mixtures which, when used in place of the esters of hydroxy aliphatic carboxylic acids themselves, possess certain properties and advantages not possessed by either ingredient alone. These advantages and properties will be described below.

Sucrose octanitrate is readily soluble in nitrated ethyl lactate, nitrated methyl lactate, nitrated ethyl glycollate, nitrated butyl lactate, etc. The degree of solubility of sucrose octanitrate varies with each solvent. Also, the viscosity of the solutions of sucrose octanitrate varies according to the particular solvent used. Consequently each solvent, when used in the nitration, has its own distinctive effect upon the physical condition of the product of nitration, that is, the product of the nitration may vary from a liquid to a pasty or granular mass composed of crystals, depending upon the hydroxy acid ester used. Thus, for example, nitrated butyl lactate is preferred over nitrated ethyl lactate if the product desired is to be a crystalline one.

Although such factors as solubility and viscosity of sucrose octanitrate in these nitrated hydroxy acid esters have a significant bearing upon the modus operandi of my process of nitration these are not the sole determinant factors. Such other factors as super cooling of the sucrose octanitrate when dissolved in a solvent, delayed crystallization of the sucrose octanitrate even after it has separated from its solvent, solubility of the mixed acid in the liquid nitration products, and other factors, the exact nature of which are unknown, have a very important effect upon the success of my process.

I have discovered that the addition of one or more members of the group consisting of compounds having the formula $C_nH_{2n+1}NO_3$, where $n$ equals one to five, compounds having the formula $C_nH_{2n+2-m}Cl_m$, where $n$ equals one to five and $m$ equals one to eight, and dichlorethylether, to an ester or a plurality of esters of hydroxy aliphatic carboxylic acids produces mixtures of usefulness in the nitration of sugar to sucrose octanitrate, and that these mixtures possess unusual and distinctive properties, which properties are not to be expected from a knowledge of the properties of the individual members of a given mixture. For instance, if nitrated ethyl lactate itself is used with sucrose with a mixed acid of say 60% nitric acid and 40% sulfuric acid essentially as described in examples below, the resulting product will contain no crystalline sucrose octanitrate or merely a very insignificant amount, even though analysis will show the sugar to be nitrated to sucrose octanitrate.

Similarly, if carbon tetrachloride be used alone with sucrose, the resulting product will not be crystalline.

In each case a viscous emulsion, gum or plastic mass results, without the separation of even an appreciable amount of crystalline sucrose octanitrate, and this occurs even when the solubility relationships are such that the sucrose octanitrate should separate as crystals.

If now, we make a mixture consisting of say 60% by weight of ethyl lactate and 40% carbon tetrachloride and use this with sucrose in essentially the same manner, an entirely different and new result is obtained. The product, sucrose octanitrate, begins to separate during the nitration in the form of plates and continues to do so throughout the further addition of the sugar and thereafter, for about one hour. The product thus gotten is crystalline and, due to the stirring, it is in the form of agglomerated particles varying in size from minute plates to pea-sized aggregates. The product is readily filterable.

Similarly, if we nitrate sugar in the presence of an aliphatic nitrate such as, for example, methyl nitrate, in essentially the same manner as in examples below, liquid or plastic products result. However, if we use a mixture of say 70% nitrated ethyl lactate and 30% methyl nitrate in place of the methyl nitrate alone, the unexpected result of sucrose octanitrate separating in the form of crystals is obtained.

As mentioned above, when it is desired to make sucrose octanitrate in the crystalline form, as a product of the nitration, I prefer to use butyl lactate instead of ethyl lactate. However, mixtures of either of these with carbon tetrachloride or methyl nitrate or ethyl nitrate or the like are still more desirable.

In order to more fully point out the function performed by my mixtures, I wish to emphasize that the nitrated hydroxy acid esters used in my process cooperate with the other agents used so as to effect a more complete separation of the sucrose octanitrate as crystals, and in doing this cause a further improvement in the nitration process itself, in that the incompletely nitrated sugar is more thoroughly exposed to the action of the nitrating acid. The separation of the sucrose octanitrate as a crystalline product prevents the formation of a gummy protective layer around the sugar as it is fed to the nitrator and thus causes an improvement in the yield. If the sugar nitrate did not separate as discrete particles an imperfect nitration would result, as is the case when sugar and glycerine are nitrated in accordance with present commercial practice, wherein the yields are relatively low and wherein the product is mainly the heptanitrate and not the octanitrate.

As illustrations of my process, the following embodiments of my invention are given.

EXAMPLE No. 1

*Nitration of sucrose in the presence of nitrated butyl lactate and carbon tetrachloride*

1351 parts of a mixed acid consisting of 57.8% nitric acid, 0.3% $N_2O_3$, 2.5% water and 39.4% sulfuric acid (by weight) are placed in a suitable nitrator and cooled to below 10° C. To this cooled mixed acid, add with stirring, 130 parts of a mixture consisting of 60% by weight of nitrated butyl lactate and 40% carbon tetrachloride and then 265 parts granulated sugar (dry), keeping the temperature below 10° C. preferably at about 0° C. When about half of the sugar has been added the separation of crystals of sucrose octanitrate will usually be observable. After all the sugar has been added, the mixture is stirred for about one hour additional, when the charge in the nitrator is allowed to flow to a separator. The sucrose octanitrate floats and, after draining away the acid layer underneath, the sucrose octanitrate is drowned in a relatively large volume of water. The drained acid is readily recovered. The diluted acid may or may not be recovered, depending upon costs, etc.

The sucrose octanitrate is filtered, washed with water, then with a dilute alkali, as for example, 2% sodium bicarbonate or 2% ammonia solution, and then again with water. The wet cake may then be further purified by washing with cold ethyl alcohol or propyl alcohol, or methyl alcohol, or butyl alcohol or amyl alcohol to dissolve out the soluble impurities.

The yield of sucrose octanitrate is about 517 parts or 95% of theory.

EXAMPLE No. 2

*Nitration of sucrose in the presence of nitrated butyl lactate and tetrachlorethane*

675 parts, by weight, of a mixed acid consisting of 60% nitric acid and 40% sulfuric acid are placed in a suitable nitrator and cooled below 10° C. To this cooled mixed acid, add with stirring 65 parts of a mixture consisting of 70% nitrated butyl lactate and 30% tetrachlorethane and then 150 parts of sugar, keeping the temperature below 10° C.

The procedure from this point on is essentially as described in Example No. 1.

The yield is about 263 parts of crystalline sucrose octanitrate together with an appreciable amount of sucrose octanitrate remaining in the alcohol washings.

EXAMPLE No. 3

*Nitration of sucrose in the presence of nitrated butyl lactate+nitrated ethyl lactate+ethyl nitrate*

Using 65 parts by weight of a mixture consisting of:

| | Parts by weight |
|---|---|
| Nitrated butyl lactate | 25 |
| Nitrated ethyl lactate | 26 |
| Ethyl nitrate | 14 | and proceeding as in Example No. 2 with the substitution of this mixture for the nitrated butyl lactate-tetrachlorethane mixture, gave a yield of crystalline sucrose octanitrate of 260 parts.

EXAMPLE No. 4

*Nitration of sucrose in the presence of nitrated butyl lactate+nitrated ethyl lactate+butyl nitrate*

Using 65 parts by weight of a mixture consisting of:

| | Parts by weight |
|---|---|
| Nitrated butyl lactate | 39 |
| Nitrated ethyl lactate | 13 |
| Butyl nitrate | 13 | and proceeding as in Example No. 2 with the substitution of this mixture for the nitrated butyl lactate-tetrachlorethane mixture, gave a yield of crystalline sucrose octanitrate of 270 parts.

EXAMPLE No. 5

*Nitration of sucrose in the presence of nitrated butyl lactate+amyl nitrate*

Using 65 parts by weight of a mixture consisting of:

| | Parts by weight |
|---|---|
| Nitrated butyl lactate | 45 |
| n-Amyl nitrate | 20 | and proceeding as in Example No. 2 with the substitution of the above mixture for the nitrated butyl lactate-tetrachlorethane mixture gave a yield of crystalline sucrose octanitrate of 273 parts.

It should be noted that these examples are given merely by way of illustration, and that variations in proportions of ingredients, temperatures, time of nitration, etc. may be made without departing from the spirit of this invention. Also, I may vary the manner of utilization of the conitrating liquid, that is, I may first mix the alcohol and the hydroxy acid ester and then run these into the nitrator containing the mixed acid. I may nitrate these individually and then run the nitrated products into the mixed acid to be used in nitrating the sugar; or, I may carry out this preliminary preparation of the nitrating mixture in any manner suitable for my needs.

It is important to note that although in the specific examples given, the materials used as addition agents to the esters of the hydroxy aliphatic carboxylic acids are liquids. The use of the gaseous or the solid members requires no significant change in the operations. The gaseous members are passed into the esters of the hydroxy aliphatic acids either before or during the nitration operation itself. The solid members are usually dissolved in the esters of the hydroxy aliphatic carboxylic acids before these esters are added to the nitrating bath.

Furthermore, it will be noted that in my examples I have mentioned only the lactic acid esters, but I wish to make it clear that the glycollic acid esters are the full equivalents of the lactic acid esters and may be used interchangeably or in admixture therewith in my process.

Also, I wish to emphasize that compounds of the general formula $C_nH_{2n+1}NO_3$ where $n$ equals one to five, and compounds of the general formula $C_nH_{2n+2-m}Cl_m$, where $n$ equals one to five and $m$ equals one to eight, are the full equivalents of the specific members such as methyl nitrate, ethyl nitrate, amyl nitrate, butyl nitrate, carbon tetrachloride, tetrachlorethane and dichlorethyl-ether mentioned in the examples above. Hence such substances as isopropyl nitrate, secondary butyl nitrate, isobutyl nitrate, tertiary butyl nitrate, isoamyl nitrate, etc. which correspond to the general formula of $C_nH_{2n+1}NO_3$ given above as well as such substances as mono- and dichlormethane, mono-, di-, tri-, penta- and hexachlorethane, mono-, di-, tri-, tetra-, penta-, hexa-, hepta-, and octa chlorides of propane, butane and pentane, which correspond to the general formula of $C_nH_{2n+2-m}Cl_m$ given above, are to be considered as the equivalents of the members actually given in the specific examples.

As many modifications may be made in the practice of this invention, without departing from the scope of the disclosures as herein made, no limitations should be placed upon my invention, except as indicated in the appended claims.

I claim:

1. The process of nitration which comprises nitrating sucrose in the presence of a mixture consisting predominantly of an alkyl ester of a mono hydroxy aliphatic carboxylic acid, said alkyl group containing not more than five carbon atoms, and one or more members of the group consisting of: methyl nitrate, ethyl nitrate, propyl nitrate, amyl nitrate, butyl nitrate, dichlorethyl ether, tetrachlorethane, carbon tetrachloride, chloroform.

2. The process of nitration which comprises nitrating sucrose in the presence of a mixture consisting predominantly of a nitrated alkyl ester of a mono hydroxy aliphatic carboxylic acid, said alkyl group containing not more than five carbon atoms, and one or more members of the group consisting of: methyl nitrate, ethyl nitrate, propyl nitrate, amyl nitrate, butyl nitrate, dichlorethyl ether, tetrachlorethane, carbon tetrachloride, chloroform.

3. The process of nitration which comprises nitrating sucrose in the presence of a mixture consisting predominantly of an alkyl ester of a mono hydroxy aliphatic carboxylic acid, said alkyl group containing not more than five carbon atoms, and one or more members of the group consisting of: methyl nitrate, ethyl nitrate, propyl nitrate, amyl nitrate, butyl nitrate, dichlorethyl ether, tetrachlorethane, carbon tetrachloride, chloroform.

4. The process of nitration which comprises nitrating sucrose in the presence of a mixture consisting predominantly of an alkyl ester of a mono hydroxy aliphatic carboxylic acid, said alkyl group containing not more than five carbon atoms, and one or more members of the group consisting of: methyl nitrate, ethyl nitrate, propyl nitrate, amyl nitrate, butyl nitrate, dichlorethyl ether, tetrachlorethane, carbon tetrachloride, chloroform at a temperature less than 10° C.

5. The process of nitrating sucrose which comprises adding sucrose to a nitration bath comprising sulphuric acid, nitric acid, an alkyl ester of a mono hydroxy aliphatic carboxylic acid, said alkyl group containing not more than five carbon atoms, and one or more members of the group consisting of: methyl nitrate, ethyl nitrate, propyl nitrate, amyl nitrate, butyl nitrate, dichlorethyl ether, tetrachlorethane, carbon tetrachloride, chloroform, the proportion of alkyl ester of monohydroxy aliphatic carboxylic acid present in the mixture being greater than that of any member or combination of members of aforesaid group, present in the mixture.

6. The process of nitrating sucrose which comprises adding sucrose to a nitration bath comprising sulphuric acid, nitric acid, an alkyl ester of a monohydroxy aliphatic carboxylic acid, said alkyl group containing not more than five carbon atoms, and one or more members of the group consisting of: methyl nitrate, ethyl nitrate, propyl nitrate, amyl nitrate, butyl nitrate, dichlorethyl ether, tetrachlorethane, carbon tetrachloride, chloroform, the proportion of alkyl ester of monohydroxy aliphatic carboxylic acid present in the mixture being greater than that of any member or combination of members of aforesaid group present in the mixture; separating the nitrated sugar from the spent acid, washing the nitrated sugar with water and with a weak solution of an alkali, and purifying the nitrated sugar by extracting from it the alcohol soluble impurities by washing the crystals with a monohydric aliphatic alcohol containing not more than five carbon atoms.

7. The process of nitrating sucrose which comprises adding about 130 parts of a mixture consisting of 60% by weight of a nitrated alkyl ester of a monohydroxy aliphatic carboxylic acid, said alkyl group containing not more than five carbon atoms, and 40% by weight of one or of a combination of two or more members of the group consisting of: methyl nitrate, ethyl nitrate, propyl nitrate, amyl nitrate, butyl nitrate, dichlorethyl ether, tetrachlorethane, carbon tetrachloride, chloroform, to about 1350 parts by weight of a mixed acid consisting of approximately 60% nitric acid and 40% sulphuric acid (by weight); adding 265 parts of dried sucrose in small portions, at a temperature below 10° C.; separating the crystalline sucrose octanitrate from the spent acid, washing and purifying.

JOSEPH A. WYLER.